Patented June 18, 1929.

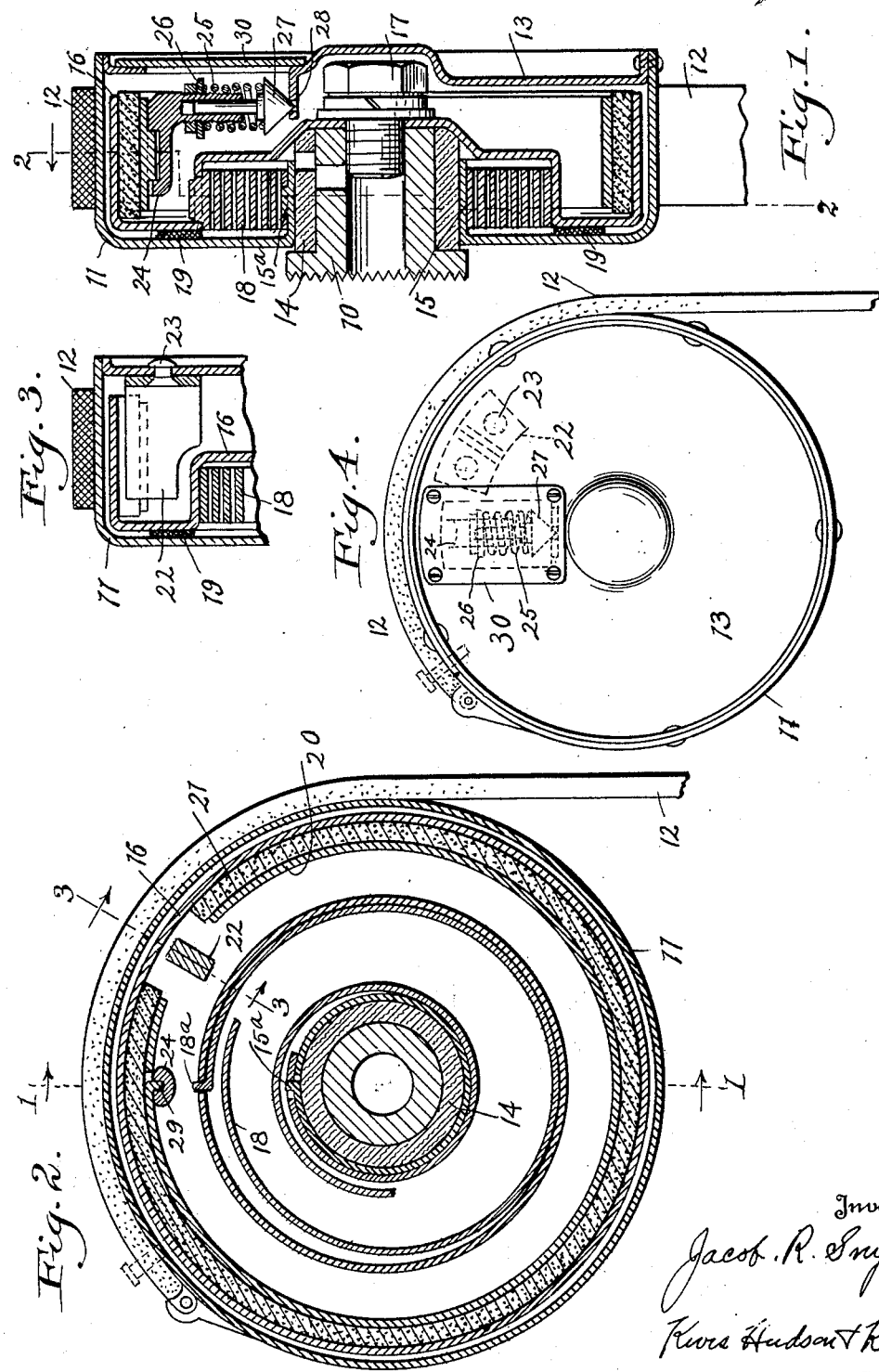

1,717,526

UNITED STATES PATENT OFFICE.

JACOB R. SNYDER, OF CLEVELAND HEIGHTS, OHIO.

SHOCK ABSORBER.

Application filed April 26, 1926, Serial No. 104,587. Renewed November 8, 1928.

This invention relates to shock absorbers and has particular reference to shock absorbers for motor vehicles in which the shock absorber, while permitting the free and unrestricted compression of the main springs, frictionally retards or checks the rebound or expansion stroke.

The main object of the invention is to provide a shock absorber which does its work effectively and reliably but which is nevertheless inexpensive to manufacture and is durable in construction. In other words, it is one of the objects to provide an efficient, inexpensive shock absorber which will stand up under the severe use to which it is subjected without requiring frequent repairs or attention.

A further object is to provide an improved shock absorber of what may be termed the one-way friction type, that is to say one which frictionally retards or checks the rebound stroke only, said shock absorber also having what may be termed an idle period permitting, without retardation, minor vibrations or movements of the main springs.

The invention may be briefly summarized as consisting in certain novel details of construction and combinations and arrangements of parts which will be described in the specification and set forth in the appended claims.

In the accompanying sheet of drawings Fig. 1 is a transverse sectional view through the shock absorber substantially along the line 1—1 of Fig. 2.

Fig. 2 is a sectional view substantially along the line 2—2 of Fig. 1 looking in the direction indicated by the arrows.

Fig. 3 is a fragmentary sectional view substantially along the line 3—3 of Fig. 2, and Fig. 4 is a side view of the shock absorber on a slightly reduced scale.

Referring now to the drawings the shock absorber illustrated is designed to be mounted on the chassis of an automobile and it comprises a stationary center bolt 10 adapted to be secured by suitable fitting to the chassis frame and rotatable in opposite directions on the center bolt is a drum 11 to which is attached in a suitable manner a strap 12 adapted to be connected to the axle of the vehicle and to be wound onto and unwound from the drum as it rotates in opposite directions. The drum 11 is preferably formed of two stampings, one of which forms the periphery, one side and the hub of the drum and the other which is designated 13 forming the opposite side and being removably attached to the main stamping. Between the drum 11 and the center bolt is a non-metallic bearing 14 preferably formed of wood and preferably forced into a laterally extending hub-like flange 15 of the main stamping of the drum.

Inside the rotatable drum 11 is a stationary drum 16 which is concentric with respect to the rotatable drum and is held stationary by being clamped and preferably also interlocked with the end of the center bolt 10 by a bolt 17 which is screwed into a threaded portion of the center bolt, the latter preferably being hollow as illustrated. The stationary drum 16 as herein illustrated extends outwardly from the center bolt then laterally toward the side of the main stamping of drum 11 and close to the same so as to form with said stamping a spring housing and then the stationary drum again extends outwardly close to the periphery of drum 11 and then laterally toward the stamping of drum 11 forming the peripheral portion. This stationary drum constitutes one of the two frictional members of the device.

In the housing just referred to is located a spring 18 which is adapted to rotate the drum 11 in one direction so as to wind the strap thereon during the compression stroke of the main springs of the vehicle. In this instance the outer end of spring 18 is held stationary by being attached to the stationary drum 16. This connection can be formed in different ways but in this instance a lip 18$^a$ formed on the outer end of spring 18 is extended through an opening in the stationary drum as best illustrated in Figs. 1 and 2. The inner end of the spring is in this instance attached to the hub 15 of the rotatable drum. This connection also may be formed in different ways but in this case the inner end of the spring is hooked over a lip 15$^a$ struck outward from the hub of flange 15 of the rotatable drum.

Thus the spring is effective to turn the drum 11 in one direction so as to wind the strap thereon during the compression stroke of the main springs and permits the drum 11 to be rotated in the opposite direction against the tension of spring 18 when the strap is pulled out or unwound from the drum during the rebound stroke.

As lubricant is adapted to be supplied to spring 18 to render it silent in action the outer portion of the housing for spring 18 is preferably sealed by a packing strip 19 which in this instance is arranged between the adjacent parallel portions of the two drums and which may be attached to either the rotating or stationary part. This lubricant may be supplied to the spring compartment either through the center bolt or directly through the side wall of the main stamping of the rotatable drum.

The other friction member which cooperates with the peripheral portion of stationary drum 16 is adapted to be rotated by the drum 11. This second friction member is in this instance arranged inside the peripheral portion of the statonary drum 16 and it consists of a flexible metal band 20 between which and the inner periphery of the drum 16 suitable friction material is provided. This friction material which is shown at 21 may be attached either to the outer surface of band 20 or to the inner surface of drum 16 but preferably on the band.

It will be noted particularly by reference to Fig. 2 that the friction member 20 is substantially circular but preferably the ends are spaced a short distance apart as illustrated in Fig. 2 so that there will be a lost motion connection between this friction member and the driving member of the drum 11. This driving member is in the form of a finger 22, which is attached to the stamping 13 and projects laterally inward between the ends of the movable friction member as illustrated in Figs. 2 and 3. This driving member 22 is preferably formed from a stamping doubled upon itself to form the portion which extends laterally between the ends of the friction member 20 and having flange like portions on opposite sides of the projecting portion secured by rivets or equivalent fastening means 23 to the stamping 13.

It will be seen that with this construction the drum may move back and forth slightly without shifting the movable friction member. This allows minor vibrations of the main springs to take place without any retarding action by the shock absorber but as the drum 11 is rotated further in either direction the finger 22 engages one end of the movable friction member, preferably the end of the friction material 21 so that the engagement will be noiseless, and then moves the friction member with the drum 11.

In order that the friction member 20 (with its friction material 21) may be expanded so as to frictionally engage the peripheral wall of the stationary drum 16 and thereby frictionally retard the rebound stroke of the main springs, and to automatically contract so as to be relatively free of the stationary drum during the compression of the main spring provision is made for at all times yieldingly pressing one end of the friction member out against the stationary drum 16, the end which is thus pressed outward being the end opposite to that which is engaged by the finger 22 during the movement of drum 11 in the rebound stroke.

The end of the friction member 20 may be constantly pressed outward by different means but in this instance by a shoe 24 which is pressed yieldingly outward against the friction member 20 near one thereof by a spring 25 surrounding an inwardly extending tubular portion of the shoe (see Fig. 1) and arranged between an adjustable abutment 26 on the tubular portion of the shoe and the head of a pin 27 which is supported on a suitable shoulder 28 formed by the inturned lip of the stamping 13 of drum 11. The inner end of the pin 27 preferably engages a fixed portion of the shoulder and the shoe 24 preferably engages a fixed portion of the friction member 20 but inasmuch as there is a lost motion connection between the movable drum 11 and the friction member 20 it is desirable that the shoe 24 have a rocking engagement with the friction band and the inner end of the pin have a rocking engagement with the shoulder 28 of stamping 13. This result is accomplished in this instance by providing the outer part of shoe 20 with a slot which engages an inturned lip 29 on the friction band 20 and by forming the head of pin 27 in the shape of a cone with the point or inner end thereof engaging an opening formed in the shoulder or extension 28 against which the pin 27 bears.

The amount of pressure exerted by the spring 25 on the shoe 24 can be varied by adjusting the abutment 26 which preferably has a threaded connection with the tubular portion of the shoe and in order that access may be had for the purpose of adjustment the portion of the stamping 13 opposite the abutment may be provided with a removable or movable door 30. Thus it will be seen that when the drum 11 is rotated in a direction such that the finger 22 engages the end of friction member 20 which is pressed outward, the friction member 20 may be rotated around the inside of stationary drum 16 with practically no friction, the band then being contracted. This occurs when the drum 11 is rotated in a direction to wind the strap 12 thereon or during the compression stroke of the main springs. However, during the rebound stroke of the main springs in which event drum 11 is rotated in the opposite direction, the driving finger 22 rotates the friction member 20 by its engagement with the opposite end of the friction member. It will be seen at once that when driving pressure is exerted by the finger in this direction or on this end of friction member 20 the latter will be expanded into frictional engagement with the stationary drum and, therefore, frictionally retard the rotation of the drum. The degree of friction exerted by the rotatable friction member against the stationary drum or friction member during the rebound stroke will depend on the degree of pressure with which the shoe 24 presses the end of the band outwardly, but this, as already stated, can be adjusted as desired.

Thus this shock absorber has the desired action during rotation in both directions, at the same time providing the free or idle period to permit minor vibrations in the main springs without material resistance by the shock absorber. Additionally this shock absorber is simple in construction and therefore durable as well as satisfactory in action.

While I have shown the preferable construction I do not desire to be confined to the precise details shown but aim in my claims to cover all modifications which do not involve a departure from the spirit and scope of my invention as defined in the appended claims.

Having thus described my invention, I claim:

1. A shock absorber comprising a rotatable drum adapted to receive a strap which may be wound thereon and unwound therefrom, a stationary drum constituting a friction member, a movable friction member arranged within the stationary drum and means whereby it is moved in opposite directions relative to the stationary drum by the rotatable drum as it rotates in opposite directions.

2. In a shock absorber, a rotatable drum having a strap attached thereto, a stationary drum constituting a friction member, an expansible and contractable friction band engaging the stationary drum, and means forming a driving connection between the rotatable drum and opposite ends of the band.

3. In a shock absorber, a rotatable drum to which a strap is attached, a stationary drum arranged concentric with respect to the rotatable drum and constituting a friction member, a flexible band, means for pressing one end of the band out against the stationary drum, and means for forming a driving connection between the rotatable drum and the band whereby the rotatable drum rotates the band in opposite directions.

4. In a shock absorber, a rotatable drum to which a strap is attached, a stationary drum constituting a friction member, a flexible band, means for pressing one end of the band out against the stationary drum, and means rotatable with the drum and engageable with opposite ends of the band for shifting it in opposite directions.

5. In a shock absorber, a rotatable drum to which a strap is attached, a stationary drum constituting a friction member, a flexible band, means for pressing one end of the band out against the stationary drum, and a lost motion driving connection between the rotatable drum and the band, by which the rotatable drum rotates the band in opposite directions.

6. In a shock absorber, a rotatable drum to which a strap is attached, a stationary drum constituting a friction member, a flexible band, means for pressing one end of the band against the stationary drum, a driving member rotatable with the drum and extending between the ends of the band, and serving to rotate the band in opposite directions.

7. In a shock absorber, a rotatable drum to which a strap is attached, a stationary drum constituting a friction member, a flexible band, means for pressing one end of the band against the stationary drum, a driving member rotatable with the drum and extending between the ends of the band, the latter being spaced apart so that a lost motion connection is provided between the driving member and the band, by which the drum rotates the band in opposite directions.

8. In a shock absorber, a rotatable drum having a strap attached thereto, a spring connected to the drum and serving to rotate the same in one direction; a stationary drum arranged inside the rotatable drum and having a peripheral portion adjacent the latter, a flexible friction band engaging the inner periphery of the stationary drum, means forming a driving connection between the rotatable drum and the band so that the band will be turned in opposite directions by the rotatable drum and will frictionally engage the stationary drum when the drum is rotated in one direction and is relatively free therefrom when the drum is rotated in the opposite direction.

9. In a shock absorber, a hollow rotatable drum having a strap attached thereto, a stationary drum arranged inside the rotatable drum, portions of the stationary and rotatable drums forming a housing, a spring in said housing and serving to rotate the first named drum in one direction, other portions of the stationary and rotatable drums forming a friction chamber, a friction band in the last named chamber engaging the inner side of the peripheral portion of the stationary drum, and means whereby said friction band is rotated by the drum in opposite directions relatively freely in one direction and in frictional engagement with the stationary drum in the opposite direction.

10. In a shock absorber, a hollow rotatable drum having a strap attached thereto, a stationary drum arranged inside the rotatable drum, portions of the stationary and rotatable drums forming a housing, a spring in said housing and serving to rotate the first named drum in one direction, other portions of the stationary and rotatable drums forming a friction chamber, a friction band in the last named chamber engaging the inner side of the peripheral portion of the stationary drum, and means whereby said friction band is rotated by the drum in opposite directions relatively freely in one direction and in frictional engagement with the stationary drum in the opposite direction, there being a lost motion driving connection between the rotatable drum and said band.

11. In a shock absorber, a hollow rotatable drum having a strap attached thereto, a stationary drum arranged inside the rotatable drum, portions of the stationary and rotatable drums forming a housing, a spring in said housing and serving to rotate the first named drum in one direction, other portions of the stationary and rotatable drums forming a friction chamber, a friction band in the last named chamber engaging the inner side of the peripheral portion of the stationary drum, and means whereby said friction band is rotated by the drum in opposite directions relatively freely in one direction and in frictional engagement with the stationary drum in the opposite direction, there being a lost motion driving connection between the rotatable drum and said band, and means arranged between a portion of the rotatable drum and a portion of the band for pressing the latter out against the stationary drum.

In testimony whereof, I hereunto affix my signature.

JACOB R. SNYDER.